F. E. KELLER.
BATTERY HOLDER AND FASTENER.
APPLICATION FILED MAR. 23, 1921.
1,430,741.
Patented Oct. 3, 1922.
2 SHEETS—SHEET 1.
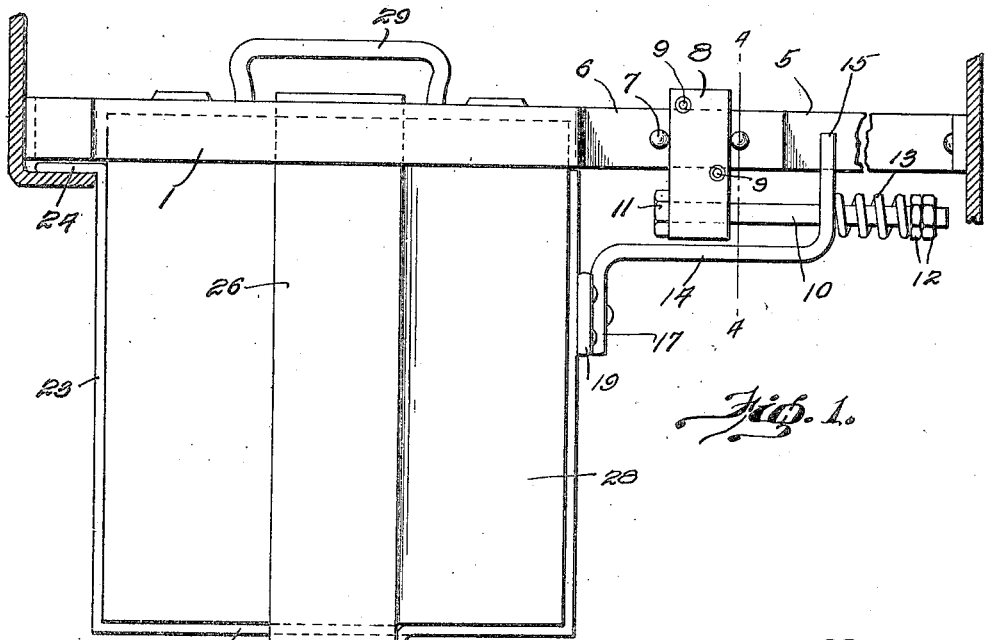
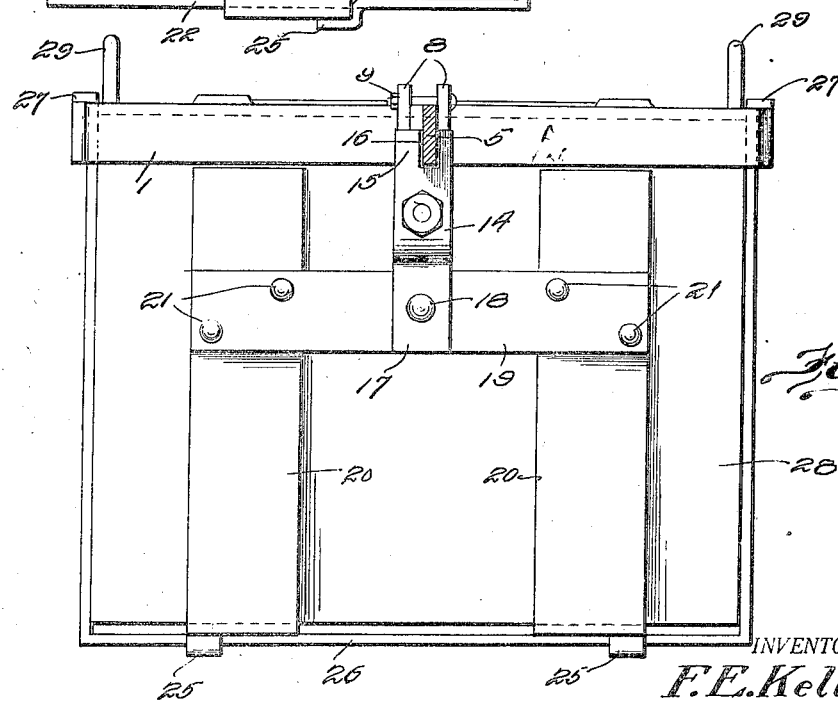
INVENTOR.
F. E. Keller.
BY
Hy W Stackpole
ATTORNEY.

F. E. KELLER.
BATTERY HOLDER AND FASTENER.
APPLICATION FILED MAR. 23, 1921.
1,430,741.
Patented Oct. 3, 1922.
2 SHEETS—SHEET 2.
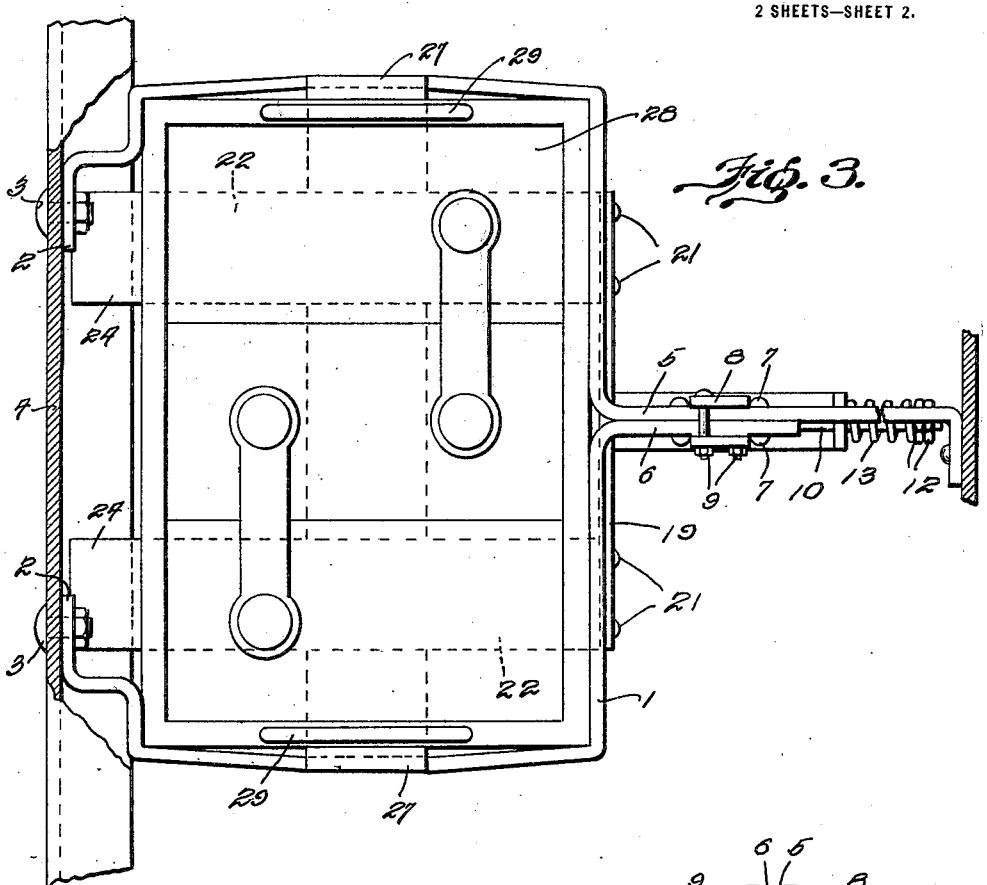
Fig. 3.
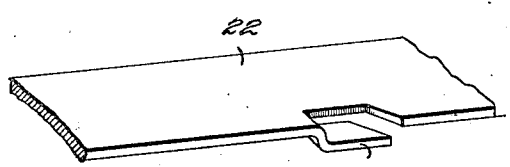
Fig. 5.
Fig. 4.
Inventor:
F. E. Keller.
H. W. Stackpole
Attorney.

Patented Oct. 3, 1922.

1,430,741

UNITED STATES PATENT OFFICE.

FRANK E. KELLER, OF CARNEGIE, OKLAHOMA.

BATTERY HOLDER AND FASTENER.

Application filed March 23, 1921. Serial No. 454,295.

*To all whom it may concern:*

Be it known that I, FRANK E. KELLER, a citizen of the United States, residing at Carnegie, in the county of Caddo and State of Oklahoma, have invented a new and useful Battery Holder and Fastener, of which the following is a specification, reference being had to the accompanying drawings, which are hereby made a part hereof.

This invention relates to battery-holders and is particularly adapted to holding and fastening the storage battery used as a part of the starting and lighting equipment of a model T Ford automobile.

In that model the battery is mounted in a cage or open frame constructed of bar-iron, the rack or frame being attached to one side of the chassis with a reach or arm extending across to the opposite side rail, thus exposing the battery to danger of injury from the shaking and jar caused in running the car, particularly over rough and uneven roads.

The object of my invention is to provide a holder of simple construction, easily and quickly applied, which will hold the battery firmly and securely in place without injury to the battery-box and prevent the battery from shaking around in the conventional rack; thus preserving the box as well as the battery. This may be done without altering the standard rack in any respect. The tension of my holder may be quickly and easily adjusted by means of the tension-spring provided for that purpose and to lessen the jar of the battery.

I attain these objects by means of the construction and arrangement of parts hereinafter described and illustrated in the accompanying drawings, in which,—

Figure 1 is a view of an end elevation of a storage battery in the conventional rack with my device attached;

Fig. 2, a side view of the same;

Fig. 3, a plan view of the same;

Fig. 4, a detail view of the clamp (through 4—4 of Fig. 1) by means of which my device is secured to the reach, and Fig. 5, a detail view of the off-set formed on the under portions of the stirrups of my device.

Similar numerals of reference indicate like parts throughout the several views.

The battery holder now in use on model T of the Ford automobile comprises a rectangular yoke 1 in two parts with their ends 2 secured to the side rail of the chassis by bolts 3 and the end 5 of one part, extended to reach across the chassis, is bolted to the side-rail (as shown in Figs. 1 and 3 of the drawings); the end 6 of the other part is somewhat shorter than 5 and is securely bolted at 7 to such reach 5. The battery 28 is mounted in stirrup 26 supported by yoke 1, to which it is secured by clamps 27, and is provided with handles 29 used also as hold-down clips.

My invention is a rectangular frame consisting of stirrups 20 having bottom 22 and sides 23 provided with lugs 24 resting on the chassis on the side the battery is located and supported on the opposite side of the battery by means of the reach 5 extended across to the opposite side of the chassis, to which it is attached. The stirrups 20 are connected together by means of the cross-strip 19 secured thereto by attaching-bolts 21. The bracket 14, having foot 17 by means of which it is secured by bolt 18 to such cross-strip 19, forms a support for tension-bolt 10, having angular head 11 recessed in clevis 8 to prevent the bolt from turning and twin-nuts 12 and tension-spring 13 on the opposite end thereof. The clevis 8, attached to reach 5 by bolts 9, is suspended from said reach and provides a bearing for the inner end of said tension-bolt 10 which passes therethrough and is provided with twin-nuts 12 by means of which the tension on spring 13 is adjusted.

An off-set 25, as shown in detail Fig. 5, is formed (one in the edge of one strip and one in the edge of the opposite edge of the other strip) in one edge of each of the bottom strips 22, shown by dotted lines in Fig. 3 of the drawings, which, in placing my holder in position, are caused to engage stirrup 26 now in use as a part of the standard battery holder on model T of the Ford car. It will be seen that such off-set 25 forms a shoulder against which such stirrup bears, thus preventing the holder from slipping to one side.

Having thus described my invention, what I claim as new and desire to secure by Letters Patent is,—

1. The combination with a battery supporting frame, of a battery holder consisting of stirrups provided with means for securing the same to the side-rail of the chassis, a cross-strip secured to said stirrups, a bracket secured to said cross-strip, and extending outward to form a support for a tension-bolt, the tension-bolt carrying a tension-spring at one end and means for holding such spring on said bolt, means for adjusting the tension of said spring, and means for securing such support to said frame.

2. The combination with a battery supporting frame provided with a main stirrup, of a battery holder and fastener consisting of stirrups provided with means for securing such stirrups to the side-rail of the chassis, off-sets forming shoulders in the bottom strips of such stirrups to engage opposite edges of such main stirrup of said frame, a cross-strip secured to said stirrups, a bracket secured to said cross-strip and extending outward to form a support for a tension-bolt, the tension-bolt carrying a tension-spring at one end, means for retaining said spring on said bolt, a support for the opposite end of said bolt, means for adjusting the tension of said spring and means for securing such support to said frame.

FRANK E. KELLER.

Witnesses:
 W. C. CAMPBELL,
 F. B. JONES.